(12) United States Patent
Landry, Jr. et al.

(10) Patent No.: US 9,701,823 B2
(45) Date of Patent: Jul. 11, 2017

(54) POLYMERIC BLENDS AND METHODS OF USING SAME

(71) Applicant: Chevron Phillips Chemical Company LP, The Woodlands, TX (US)

(72) Inventors: Darrell W. Landry, Jr., Owasso, OK (US); Kelly R. Frey, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 92 days.

(21) Appl. No.: 13/664,118

(22) Filed: Oct. 30, 2012

(65) Prior Publication Data

US 2013/0123414 A1    May 16, 2013

Related U.S. Application Data

(60) Provisional application No. 61/560,519, filed on Nov. 16, 2011.

(51) Int. Cl.
| | |
|---|---|
| *C08L 23/00* | (2006.01) |
| *C08L 23/06* | (2006.01) |
| *C08L 23/08* | (2006.01) |
| *C08L 23/04* | (2006.01) |

(52) U.S. Cl.
CPC .............. *C08L 23/06* (2013.01); *C08L 23/04* (2013.01); *C08L 23/0815* (2013.01); *C08L 2205/025* (2013.01)

(58) Field of Classification Search
CPC .............................. C08L 23/06; C08L 23/0815
See application file for complete search history.

(56) References Cited

U.S. PATENT DOCUMENTS

| | | | | |
|---|---|---|---|---|
| 4,339,507 | A * | 7/1982 | Kurtz et al. | 428/522 |
| 4,465,812 | A | 8/1984 | Moriguchi et al. | |
| 4,576,993 | A | 3/1986 | Tamplin et al. | |
| 4,705,829 | A | 11/1987 | Kwack et al. | |
| 5,912,076 | A * | 6/1999 | Wang et al. | 428/338 |
| 6,300,271 | B1 | 10/2001 | McDaniel et al. | |
| 6,355,732 | B1 * | 3/2002 | Beer | 525/191 |
| 6,361,875 | B1 * | 3/2002 | Karaoglu et al. | 428/515 |
| 6,824,886 | B2 * | 11/2004 | Tavernier | 428/516 |
| 6,831,141 | B2 | 12/2004 | McDaniel et al. | |
| 6,887,819 | B2 | 5/2005 | McDaniel et al. | |
| 6,933,346 | B2 * | 8/2005 | Yasaka et al. | 525/191 |
| 7,041,617 | B2 | 5/2006 | Jensen et al. | |
| 7,148,298 | B2 | 12/2006 | Jensen et al. | |
| 7,951,873 | B2 * | 5/2011 | Best et al. | 525/191 |
| 2002/0037979 | A1 * | 3/2002 | Job et al. | 526/119 |
| 2010/0047599 | A1 * | 2/2010 | Kvamme et al. | 428/523 |

FOREIGN PATENT DOCUMENTS

| | | | |
|---|---|---|---|
| EP | 1216824 | A1 | 6/2002 |
| EP | 2130865 | A1 | 12/2009 |
| WO | WO2011004001 | * | 1/2011 |
| WO | 2011037590 | A1 | 3/2011 |

OTHER PUBLICATIONS

MarFlex 4517 flyer, 2011.*
MarFlex D163 flyer, 1996.*
ExxonMobil LDPE LD200.48 flyer, 2010.*
LDPE LD 201.48 flyer, 2010.*
LDPE SABIC 2308 TN00 flyer, 2010.*
DOW LDPE 4012 flyer, 2011.*
Filing receipt and specification for provisional patent application entitled "Polymeric Blends and Methods of Using Same," by Darrell W. Landry, Jr., et al., filed Nov. 16, 2011 as U.S. Appl. No. 61/560,519.
Foreign communication from a related counterpart application—International Search Report and Written Opinion, PCT/US2012/062588 dated Dec. 20, 2012, 6 pages.
MarFlex® D163, Preliminary Datasheet—Metallocene Linear Low Density Polyethylene, MarFlex Polyethylene, 2011, 1 page, Chevron Phillips Chemical Company LP.
MarFlex® D163 Polyethylene, Material Safety Data Sheet, Version 1.2, May 11, 2011, 9 pages, Chevron Phillips Chemical Company LP.
MarFlex® 4517, Extrusion Coating Grade Low Density Polyethylene, MarFlex Polyethylene, Apr. 2011, 1 page, Chevron Phillips Chemical Company LP.
MarFlex® 4517 Polyethylene, Material Safety Data Sheet, Version 1.2, Mar. 2, 2011, 10 pages, Chevron Phillips Company LP.

* cited by examiner

*Primary Examiner* — Irina Krylova
(74) *Attorney, Agent, or Firm* — Conley Rose, P.C.; Rodney B. Carroll; Chad Walter

(57) ABSTRACT

A composition comprising a low density polyethylene (LDPE) and a metallocene-catalyzed linear low density polyethylene (mLLDPE) wherein the composition when extruded as a molten resin displays a neck-in value that is about equal to or increased by less than about 10% of the neck-in value observed when using the LDPE alone. A method comprising blending a LDPE and a mLLDPE of this disclosure to form a polymer blend having a miscibility factor of 1; extruding the polymer blend onto a substrate wherein the extruded polymer blend has a neck-in that is about equal to or increased by less than about 10% of the neck-in value observed when using the LDPE alone and wherein an amount of trim waste produced is equal to or about 10% less trim waste than the amount of trim waste produced when utilizing an extrusion coating using LDPE alone.

19 Claims, 3 Drawing Sheets

POLYMERIC BLENDS AND METHODS OF USING SAME

CROSS-REFERENCE TO RELATED APPLICATIONS

The present application is a non-provisional of and claims priority to U.S. Provisional Application No. 61/560,519, filed on Nov. 16, 2011 and entitled "Polymeric Blends and Methods of Using Same," which is incorporated by reference herein in its entirety.

TECHNICAL FIELD

This disclosure relates to polymeric compositions. More specifically, this disclosure relates to polymeric compositions comprising a blend of polymers having improved processability.

BACKGROUND

Polyolefins are plastic materials useful for making a wide variety of valued products due to their combination of stiffness, ductility, barrier properties, temperature resistance, optical properties, availability, and low cost. One of the most valued products is plastic films. In particular, PE is the one of the largest volume polymers consumed in the world. It is a versatile polymer that offers high performance relative to other polymers and alternative materials such as glass, metal, or paper. Plastic films such as PE films are mostly used in packaging applications but they also find utility in the agricultural, medical, and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

A large number of extrusion coating applications utilize LDPE for its good processability characteristics. One drawback to the use of blends of LDPE polymers with other PE polymers is that the introduction of the second type of PE polymer often detrimentally impacts the process characteristics of LDPE. Thus an ongoing need exists for improved blends having a user and/or application desired combination of physical properties and processability.

SUMMARY

Disclosed herein is a composition comprising a low density polyethylene (LDPE) and a metallocene-catalyzed linear low density polyethylene (mLLDPE) wherein the composition when extruded as a molten resin displays a neck-in value that is about equal to or increased by less than about 10% of the neck-in value observed when using the LDPE alone.

Also disclosed herein is a method comprising blending a LDPE and a mLLDPE of this disclosure to form a polymer blend having a miscibility factor of 1; extruding the polymer blend onto a substrate wherein the extruded polymer blend has a neck-in that is about equal to or increased by less than about 10% of the neck-in value observed when using the LDPE alone and wherein an amount of trim waste produced is equal to or about 10% less trim waste than the amount of trim waste produced when utilizing an extrusion coating using LDPE alone.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
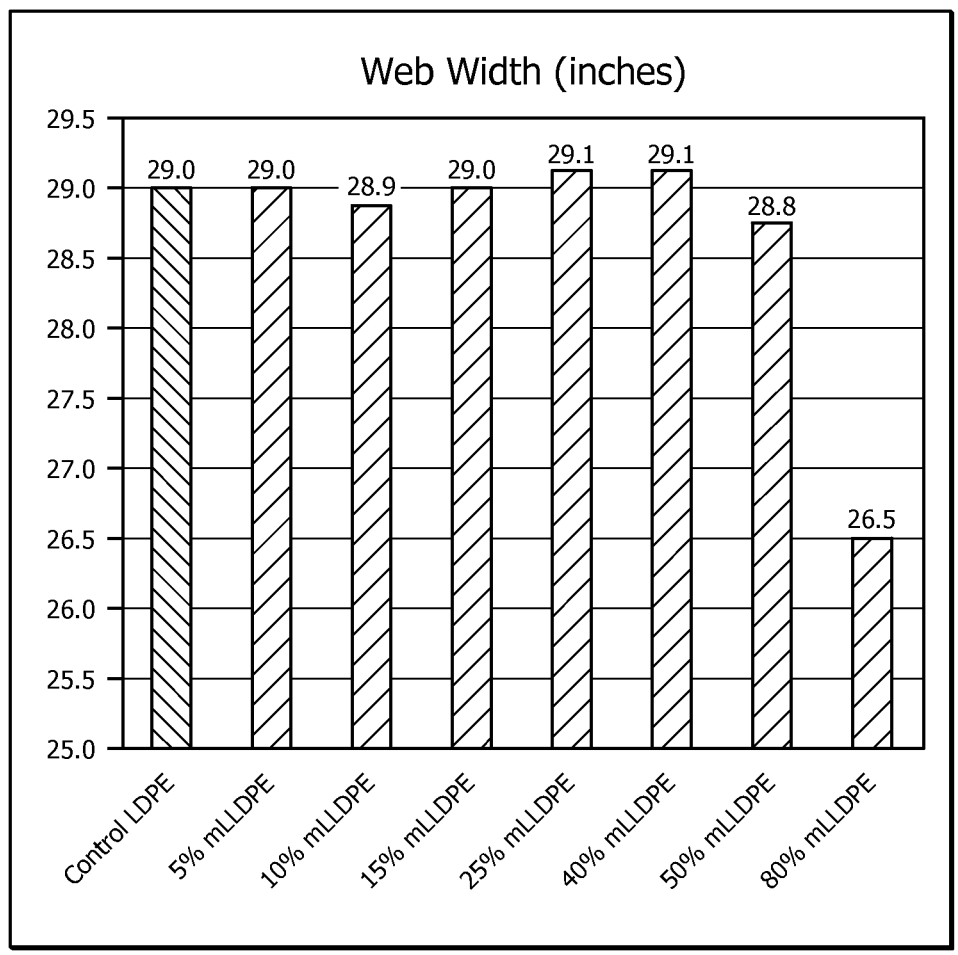
FIG. 1 is a plot of the web width as a function of sample type for the samples from Example 1.

Disclosed herein are polymer blends and methods of making and using same. In an embodiment the polymer blend comprises a LDPE and a LLDPE. Such blends may display improved thermal characteristics in addition to improvements in processability as will be described in more detail later herein. Hereinafter, this disclosure will focus on a composition comprising a LDPE and a LLDPE which is referred to as a polyethylene blend (PEB).

In an embodiment, the PEB blend comprises a LDPE. The LDPE may be a homopolymer provided however that the homopolymer may optionally contain up to 5% of another alpha-olefin. Despite the potential presence of small amounts of other alpha-olefins, the LDPE is generally referred to as a polyethylene homopolymer.

In an embodiment, a LDPE suitable for use in this disclosure may have a density of from about 0.915 g/cc to about 0.924 g/cc, alternatively from about 0.919 g/cc to about 0.924 g/cc, or alternatively from about 0.915 g/cc to about 0.919 g/cc, as determined in accordance with ASTM D1505; a melting point of from about 102° C. to about 110° C., alternatively from about 102° C. to about 106° C., or alternatively from about 106° C. to about 110° C., as determined in accordance with ASTM D3418; a melt index of from about 4.0 g/10 min. to about 17.0 g/10 min. alternatively from about 4.0 g/10 min. to about 6.0 g/10 min., or alternatively from about 6.0 g/10 min. to about 17.0 g/10 min., as determined in accordance with ASTM D1238; and a Vicat softening temperature of from about 86° C. to about 102° C., alternatively from about 92° C. to about 102° C. as determined in accordance with ASTM D1525.

An example of a LDPE homopolymer suitable for use in this disclosure includes without limitation MARFLEX 4517 which is an extrusion coating grade low density polyethylene commercially available from Chevron Phillips Chemical Co. In an embodiment, the LDPE (e.g., MARFLEX 4517) has generally the physical properties set forth in Table 1.

TABLE 1

| Properties Physical | 4517 Typical Value | Test Method |
|---|---|---|
| Density, g/cc | 0.923 g/cc | ASTM D1505 |
| Melt Index, 190 C./2.16 Kg | 5.1 g/10 min | ASTM D1238 |
| Melting Point | 108° C. | ASTM D3418 |
| Vicat Softening Temperature | 100° C. | ASTM D1525 |
| WVTR | 18 g/m$^2$/day | ASTM F1249 |
| OTR | 7200 cm$^3$/m$^2$/day | ASTM D3985 |

The LDPE may be prepared using any suitable methodology for preparation of the polymer. For example, a LDPE suitable for use in the present disclosure may be prepared by radical polymerization of the ethylene monomer. Methods of preparing a LDPE are described for example in U.S. Pat. Nos. 4,465,812; 4,576,993; and 4,705,829 each of which is incorporated by reference herein in its entirety.

In an embodiment, the LDPE is present in the PEB in an amount of from about 20 wt. % to about 99 wt. % based on the total weight of the composition, alternatively from about 30 wt. % to about 90 wt. %, or alternatively from about 50 wt. % to about 80 wt. %.

In an embodiment, the PEB blend comprises a LLDPE, alternatively a metallocene catalyzed LLDPE, alternatively a single-site metallocene catalyzed (mLLDPE). In an embodiment, the mLLDPE is a copolymer of ethylene with from about 0.2 mole % to about 0.5 mole % 1-hexene. In an embodiment, a mLLDPE suitable for use in this disclosure may have a density of from about 0.913 g/cc to about 0.918 g/cc, alternatively from about 0.913 g/cc to about 0.915 g/cc, or alternatively from about 0.915 g/cc to about 0.918 g/cc as determined in accordance with ASTM D1505; a melting point of from about 112° C. to about 120° C., alternatively from about 112° C. to about 115° C., or alternatively from about 115° C. to about 119° C. as determined in accordance with ASTM D3418; a melt index of from about 0.7 g/10 min. to about 1.6 g/10 min., alternatively from about 0.7 g/10 min. to about 1.1 g/10 min., or alternatively from about 1.1 g/10 min. to about 1.6 g/10 min. as determined in accordance with ASTM D1238; and a Vicat softening temperature of from about 100° C. to about 106° C., alternatively from about 100° C. to about 103° C., or alternatively from about 103° C. to about 106° C. as determined in accordance with ASTM D1525.

The mLLDPE may be prepared using any suitable methodology for preparation of the polymer. Methods of preparing a mLLDPE are described for example in U.S. Pat. Nos. 6,300,271; 6,831,141; 6,887,819; 7,148,298; and 7,041,617 each of which is incorporated by reference herein in its entirety.

Without limitation, a representative example of a mLLDPE suitable for use in the present disclosure includes MARFLEX D163 which is a metallocene-catalyzed mLLDPE resin that is manufactured by Chevron Phillips Chemical Company LP. A mLLDPE suitable for use in the present disclosure has about the physical properties given in Table 2. Unless otherwise specified herein, the physical properties disclosed herein were determined in accordance with the test methods recited in Table 2.

TABLE 2

|  | English | SI | Method |
|---|---|---|---|
| Nominal Resin Properties | | | |
| Density | — | 0.914 g/cm³ | ASTM D1505 |
| Melt Index, 190 C./2.16 Kg | — | 0.9 g/10 min | ASTM D1238 |
| Nominal Blown Film Properties at 1.00 mil (25 micron) | | | |
| Haze | 4% | 4% | ASTM D1003 |
| Gloss, 60° | 135 | 135 | ASTM D2457 |
| COF | >1 | >1 | ASTM D1894 |
| Dart Impact (g) | | 1500 g/mil | ASTM D1709 |
| Elmendorf Tear MD/TD (g) | | 270/360 g/mil | ASTM D1922 |
| Tensile Strength at Yield MD/TD* | 1480/1350 psi | 10/9 MPa | ASTM D882 |

TABLE 2-continued

|  | English | SI | Method |
|---|---|---|---|
| Tensile Strength at Break MD/TD | 8800/7300 psi | 61/50 MPa | ASTM D882 |
| Tensile Strength at Break TD | 5200 psi | 36 MPa | ASTM D882 |
| Tensile Strength Elongation at Break MD/TS | 500/600% | 500/600% | ASTM D882 |
| 1% Secant Modulus MD/TD | 21200/23900 psi | 146/165 MPa | ASTM D882 |
| Film Puncture Energy | 93 in·lbf | 10.5 J | ASTM D3763 |
| Film Puncture Force | 29.1 in·lbf | 129N | ASTM D3763 |
| Seal Initiation Temperature | 203° F. | 95.0° F. | ASTM F 88[+] |

*MD = machine direction TD = transverse direction
[+]Temperature at which 0.3 lb/in heat seal strength is achieved, 0.5 s dwell, 30 psi pressure, 11.8 in · min separation rate In an embodiment, the mLLDPE is present in the PEB in an amount of from about 1.0 wt. % to about 80 wt. % based on the total weight of the composition, alternatively from about 10 wt. % to about 80 wt. %, or alternatively from about 20 wt. % to about 75 wt. %.

In an embodiment, the LDPE, mLLDPE, PEB or combinations thereof may also contain additives as deemed necessary to impart desired physical properties. Examples of additives include without limitation stabilizers, antiblocking agents, slip additives, antistatic agents, ultra-violet screening agents, oxidants, anti-oxidants, ultraviolet light absorbents, fire retardants, processing oils, coloring agents, pigments/dyes, fillers, and/or the like with other components. The aforementioned additives may be used either singularly or in combination to form various formulations of the polymer. Any suitable methodology may be employed to include effective amounts of these additives into the LDPE, mLLDPE, PEB or combinations thereof. In some embodiments, the LDPE, mLLDPE, PEB or combinations thereof exclude additives of the type disclosed herein.

In an embodiment, a PEB may be prepared by combining a LDPE, a mLLDPE, and optionally additives; each of the type described herein, using an extruder in a process known as extrusion compounding. Extrusion compounding refers to the process of mixing the polymers and optional additives to produce the desired blends. The mixing may be carried out within the single screw extruder utilized in the extrusion coating process. Alternately, this mixing may be completed using a continuous mixer such as for example a mixer consisting of a short non-intermeshing counter rotating twin screw extruder for mixing/melting the components of the PEB and a single screw extruder or a gear pump for pumping. In an embodiment, the PEB may be prepared by combining a LDPE, a mLLDPE, and optionally additives by dry blending the polymers.

In an embodiment the LDPE and mLLDPE used in the formation of the PEB have a ΔMI of from about 3.1 to about 16.1, alternatively of from about 3.1 to about 5.1, or alternatively from about 5.1 to about 16.1. Herein the ΔMI refers to the absolute value of the difference between the MI of the LDPE and the MI of the mLLDPE. In an embodiment, the LDPE and mLLDPE having a ΔMI within the disclosed ranges form a miscible polymer blend suitable for use in applications such as extrusion coating. Herein a miscible polymer blend refers to the ability of the polymers in the blend to commingle and form a composition lacking significant deviations in rheology or appearance from the individual constituents of the composition. The miscibility of the polymer blend may be determined by visual observation of the blended composition to note inhomogenities in the blend such as the presence or absence of portions of the blend having distinctly different rheological features and/or appearance from other portions of the blend. The miscibility of the polymers may be rated on a scale of 1 to 4 wherein polymers that blend to form a miscible polymer blend having homogenous features may be given a miscibility rating in the range of 1 to 2 while polymers that blend to form poorly miscible to immiscible compositions may be given a miscibility rating in the range of 3 to 4. In an embodiment, a PEB of the type disclosed herein having a ΔMI within the disclosed ranges form polymer blends having a miscibility rating of 1.

In an embodiment the PEB is used in extrusion coating applications. Extrusion coating is the coating of a molten resin onto a substrate, i.e., board, paper, aluminum foils, cellulose, or plastic films. The process of extrusion coating involves extruding molten resin (e.g., PEB) from a slot die at temperatures of up to 320° C. directly onto a moving web. The resin extruding from the slot die forms a curtain of molten resin (i.e., a polymer curtain) which is applied to the substrate. The slot die may have an operational width x that is the width along which molten resin may flow and form a polymer curtain having width x that is applied to the substrate. However, molten polymer extruding through the slot die may tend to exhibit some degree of shrinkage such that the polymer curtain does not maintain the width at which it was extruded from the slot die. This phenomenon known as "neck-in" results in a tapering of the width of the polymer curtain that is applied to the substrate to a width designated y where y is less than x. Further, as result of neck-in, an uneven amount of coating is applied onto the substrate where the amount of coating present on the outer edges of the substrate is greater than the amount of coating present on the interior portion of the substrate. The outer edges may be removed and discarded so as to recover that portion of substrate having an even thickness of coating. The material that is removed is termed "trim waste."

In an embodiment, a PEB of the type disclosed herein comprising a LDPE and a mLLDPE displays an amount of neck-in value that is about equal to or increased by less than about 10% of the neck-in value observed when using the LDPE alone, alternatively that is about equal to or increased by less than about 15% of the neck-in value observed when using the LDPE alone or alternatively that is about equal to or increased by less than about 20% of the neck-in value observed when using the LDPE alone.

For example, a polymer extruding from the slot die has width y when it contacts the substrate. The neck-in value δ is the difference between the width of the slot die (x) and the width of the polymer curtain when it contacts the substrate (y) such that δ=x−y. If the neck-in value of the LDPE is designated $δ_0$ then a PEB of this disclosure may have a neck-in value that is from about $δ_0$ to about 10% greater than $δ_0$. This may result in a reduction in trim waste such that extrusion coating a substrate with a PEB of the type disclosed herein produces an amount of trim waste that is about equal to or increased by less than about 10% less of the amount of trim waste produced when using the LDPE alone, alternatively about equal to or increased by less than about 20%, or about equal to or increased by less than about 30%. It is to be understood that "using the LDPE alone" refers to preparing an extrusion coating comprising only the LDPE used in the PEB. Thus, all comparisons made with regard to "using the LDPE alone" are meant to compare the properties exhibited by the PEB comprising a LDPE and a mLLDPE to the properties exhibited by the LDPE used in the PEB singularly.

In an embodiment, the PEB is used to coat any suitable substrate. Nonlimiting examples of substrates suitable for coating with the PEB include paperboard, paper, films, foils, nonwovens, wovens or combinations thereof. The PEB may be utilized to provide an extrusion coating having a thickness of from about 0.60 mil to about 4.0 mil, alternatively from about 0.60 mil to about 2 mil, or alternatively from about 2.0 mil to about 4.0 mil.

Examples of markets for extrusion coating include without limitation a variety of end-use applications such as liquid packaging, photographic, flexible packaging, and other commercial applications. In an embodiment, the PEB is used to form an extrusion coating that is used to seal or close a package. Heat sealing is the major technique used for forming and closing flexible packages. Heat is used to rapidly activate a sealant layer comprised of a heat sealable material, usually a polymeric resin (e.g., PEB). The temperature required to activate the heat sealable material and form a durable seal is termed the seal initiation temperature (SIT) and the ability of the seal to resist opening immediately after being formed is termed hot tack. The temperature range over which a durable seal can be formed and maintained is termed the hot tack window.

Coatings formed from the PEBs of this disclosure may display improved thermal properties such as an increased heat seal strength. In an embodiment, the coatings formed from a PEB of the type disclosed herein have a SIT of from about 90° C. to about 100° C., alternatively from about 90° C. to about 99° C. or alternatively from about 95° C. to about 99° C. and a hot tack window of from about 100° C. to about 105° C., alternatively from about 101° C. to about 104° C. or alternatively from about 102° C. to about 104° C. The SIT and hot tack window may be determined using a heat seal tester in accordance with ASTM F 1921-98 method A.

In an embodiment, coatings formed from the PEBs of this disclosure may display a heat seal strength of from about 5.0 lb/inch to about 6.0 lb/inch. The heat seal strength may be determined in accordance with ASTM F1921-98. In an embodiment, the PEB comprising a LDPE and a mLLDPE may display improved processability when compared to the mLLDPE alone.

In an embodiment, an extrusion coating formed from a PEB of the type disclosed herein may display an improved abuse resistance. Herein abuse resistance refers to the ability of the coating to resist deformation when exposed to one or more forces. For example, an extrusion coating of the type disclosed herein may form a coating that exhibits increases in properties such as tear resistance, dart drop impact strength, and/or Elmendorf tear strength. Herein the tear resistance refers to the force required to tear a film or sheet as determined in accordance with ASTM D 1004. Herein the dart drop impact strength refers to the weight required to cause 50% of the tested sample to fail by impact from a falling dart under specified conditions as determined in accordance with ASTM D 1709. Herein the Elmendorf tear strength refers to the average force required to propagate tearing through a specified length of plastic film or nonrigid sheeting on an Elmendorrf-type tear tester as determined in accordance with ISO 6383-2.

The disclosure having been generally described, the following examples are given as particular embodiments of the disclosure and to demonstrate the practice and advantages thereof. It is understood that the examples are given by way of illustration and are not intended to limit the specification of the claims to follow in any manner.

EXAMPLE 1

Figure 2:
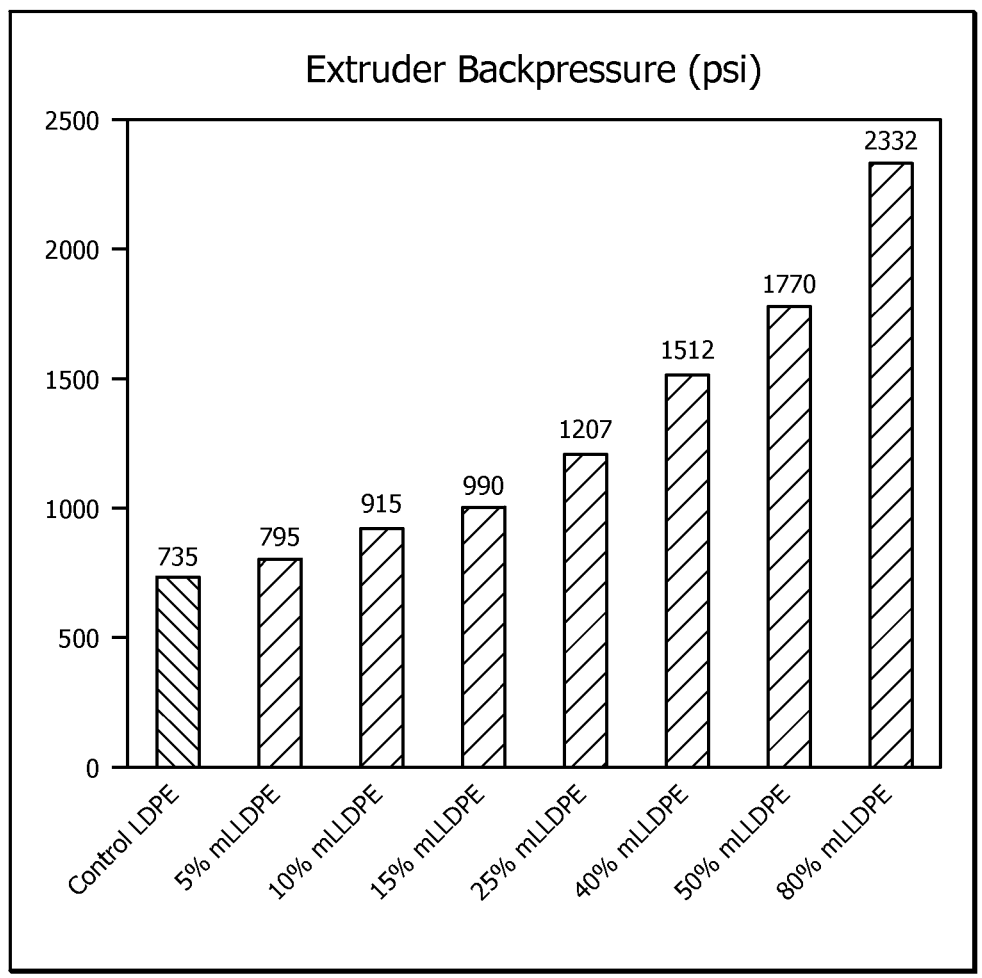
FIG. 2 is a plot of the extruder back pressure as a function of sample type for the samples from Example 1.
Figure 3:
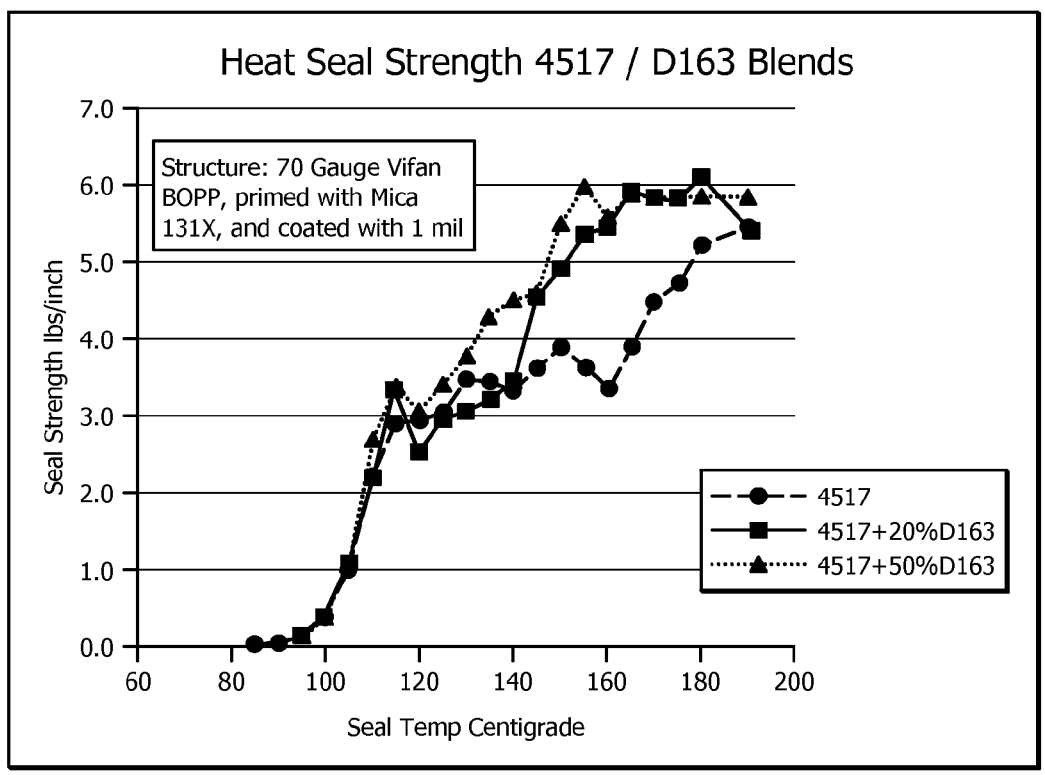
FIG. 3 is a plot of the heat seal strength as a function of seal temperature for the samples from example 1.

Seven samples of a PEB of the type described herein were prepared by blending MARFLEX 4517 with 5, 10, 15, 25, 40, 50 or 80 wt. % MARFLEX D163. The samples were then extruded onto a 70 g biaxially oriented polypropylene substrate that was primed with polyethyleneimine primer. The polymer curtain width was measured for each sample. A plot of the polymer curtain width (which is indicated as web width in FIG. 1) as a function of sample is presented in FIG. 1 while the extruder back pressure as a function of sample is shown in FIG. 2. The heat seal strength as a function of seal temperature was measured for the LDPE alone, the PEB sample containing 20 wt. % mLLDPE and the PEB sample containing 50 wt. % mLLDPE and the results are presented in FIG. 3.

The results demonstrate surprisingly and unexpectedly as the level of mLLDPE was increased in the PEB, the amount of neck-in did not increase until the mLLDPE comprised 80 wt. % of the blend. Notably, the extruder back pressure increased proportional to the amount of mLLDPE included in the PEB.

The following are additional enumerated embodiments of the concepts disclosed herein.

A first embodiment which is a composition comprising a low density polyethylene (LDPE) and a metallocene-catalyzed linear low density polyethylene (mLLDPE) wherein the composition when extruded as a molten resin displays a neck-in value that is about equal to or increased by less than about 10% of the neck-in value observed when using the LDPE alone.

A second embodiment which is the composition of the first embodiment wherein the composition when extruded as a molten resin displays a neck-in value that is increased by equal to or increased by less than about 15% of the neck-in value observed when using the LDPE alone.

A third embodiment which is the composition of any of the first through second embodiments wherein the metallocene-catalyzed linear low density polyethylene is produced using a single site metallocene.

A fourth embodiment which is the composition of any of the first through third embodiments wherein the mLLDPE is present in an amount of from about 1 wt. % to about 80 wt. % based on the total weight of the composition.

A fifth embodiment which is the composition of any of the first through fourth embodiments wherein the composition when formed into a coating displays a heat seal strength of from about 5.0 6.0 lbs/inch to about 6.0 lbs/inch.

A sixth embodiment which is the composition of any of the first through fifth embodiments wherein the composition when formed into a coating displays a seal initiation temperature of from about 90° C. to about 100° C.

A seventh embodiment which is the composition of any of the first through sixth embodiments wherein the composition when formed into a coating displays a hot tack window of from about 100° C. to about 105° C.

An eighth embodiment which is the composition of any of the first through seventh embodiments wherein the LDPE has a melt index of from about 4.6 g/10 min to about 17 g/10 min.

A ninth embodiment which is the composition of any of the first through eighth embodiments wherein the mLLDPE has a melt index of from about 0.7 to about 1.6 g/10 min.

A tenth embodiment which is the composition of any of the first through ninth embodiments wherein the composition has a compatibility rating of 1.

An eleventh embodiment which is the composition of any of the first through tenth embodiments wherein the LDPE has a density of from about 0.915 g/cc to about 0.924 g/cc.

A twelfth embodiment which is the composition of any of the first through eleventh embodiments wherein the LDPE has a melting point of from about 102° C. to about 110° C.

A thirteenth embodiment which is the composition of any of the first through twelfth embodiments wherein the LDPE has a Vicat softening temperature of from about 86° C. to about 102° C.

A fourteenth embodiment which is the composition of any of the first through thirteenth embodiments wherein the mLLDPE has a density of from about 0.913 g/cc to about 0.918 g/cc.

A fifteenth embodiment which is the composition of any of the first through fourteenth embodiments wherein the mLLDPE has a melting point of from about 112° C. to about 120° C.

A sixteenth embodiment which is the composition of any of the first through fifteenth embodiments wherein the mLLDPE has a Vicat softening temperature of from about 100° C. to about 106° C.

A seventeenth embodiment which is the composition of any of the first through sixteenth embodiments wherein the composition when formed into a coating has a thickness of from about 0.60 mil to about 4.0 mil.

An eighteenth embodiment which is an extrusion coating prepared from the composition of any of the first through seventeenth embodiments.

A nineteenth embodiment which is the flexible packaging container comprising the composition of any of the first through eighteenth embodiments.

A twentieth embodiment which is a method comprising; blending a LDPE and a mLLDPE of this disclosure to form a polymer blend having a compatibility factor of 1; extruding the polymer blend onto a substrate wherein the extruded polymer blend has a neck-in value that is about equal to or increased by less than about 10% of the neck-in value observed when using the LDPE alone and wherein an amount of trim waste produced is about equal to or increased by less than about 10% of the amount of trim waste produced when utilizing an extrusion coating using LDPE alone.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A composition comprising:
   (i) a low density polyethylene homopolymer (LDPE), wherein the LDPE has a melt index of about 5.1 g/10 min, a melting point of about 108° C., a Vicat softening temperature of about 100° C., and a density of about 0.923 g/cc; and
   (ii) a metallocene-catalyzed linear low density copolymer of ethylene and hexene (mLLDPE), wherein the mLLDPE has a density of about 0.914 g/cc, and a melt index of 0.9 g/10 min;
   wherein the composition comprises from about 5 wt. % to about 50 wt. % of the mLLDPE based on the total weight of the composition, and when extruded as a molten resin displays a neck-in value that is about equal to or increased by less than 10% of the neck-in value observed when using the LDPE alone.

2. The composition of claim 1 wherein the LDPE homopolymer has a water vapor transmission rate (WVTR) of about 18 g/m$^2$/day and an oxygen transmission rate of about 7200 cm$^3$/m$^2$/day.

3. The composition of claim 1 wherein the mLLDPE is produced using a single site metallocene.

4. The composition of claim 1 wherein the composition has a compatibility rating of 1.

5. The composition of claim 1 wherein the mLLDPE has a melting point of from about 112° C. to about 120° C.

6. The composition of claim 1 wherein the mLLDPE has a Vicat softening temperature of from about 100° C. to about 106° C.

7. An extrusion coating prepared from the composition of claim 1.

8. The coating of claim 7 having a heat seal strength of from about 5.0 lbs./inch to about 6.0 lbs./inch.

9. The coating of claim 7 having a hot tack window of from about 100° C. to about 105° C. and a seal initiation temperature of from about 90° C. to about 100° C.

10. The coating of claim 7 having a thickness of from about 0.60 mil to about 4.0 mil.

11. The composition of claim 1 having a miscibility rating of about 1.

12. The composition of claim 1 which can be extruded as a molten resin up to a temperature of 320° C.

13. The composition of claim 1 wherein the composition displays a neck-in value that is about equal to or increased by less than about 7% of the neck-in value observed when using the LDPE alone.

14. The composition of claim 1 wherein the composition displays a neck-in value that is about equal to or increased by less than about 5% of the neck-in value observed when using the LDPE alone.

15. The composition of claim 1 wherein the composition displays a neck-in value that is about equal to or increased by less than about 3% of the neck-in value observed when using the LDPE alone.

16. The composition of claim 1 wherein the composition displays a neck-in value that is about equal to or increased by less than about 1% of the neck-in value observed when using the LDPE alone.

17. The composition of claim 13 wherein the mLLDPE in the form of a film having a thickness of 1 mil has a tensile strength at yield of 1480 psi in the machine direction and 1350 psi in the transverse direction, a tensile strength at break of 8800 psi in the machine direction and 7300 psi in the transverse direction, and a 1% secant modulus of 21200 psi in the machine direction and 23900 psi in the transverse direction, each when measured in accordance with ASTM D882 at 1 mil.

18. flexible packaging container comprising the composition of claim 1.

19. A composition comprising:
   (i) a low density polyethylene homopolymer (LDPE), wherein the LDPE has a melt index of about 5.1 g/10 min, a melting point of about 108° C., a Vicat softening temperature of about 100° C., a density of about 0.923 g/cc, a water vapor transmission rate (WVTR) of about 18 g/m$^2$/day and an oxygen transmission rate of about 7200 cm$^3$/m$^2$/day; and
   (ii) a metallocene-catalyzed linear low density copolymer of ethylene and hexene (mLLDPE), wherein the mLLDPE has a density of about 0.914 g/cc, a melt index of 0.9 g/10 min, and further wherein the mLLDPE in the form of a film having a thickness of 1 mil has a tensile strength at yield of 1480 psi in the machine direction and 1350 psi in the transverse direction, a tensile strength at break of 8800 psi in the machine direction and 7300 psi in the transverse direction, and a 1% secant modulus of 21200 psi in the machine direction and 23900 psi in the transverse direction, each when measured in accordance with ASTM D882 at 1 mil;
   wherein the composition comprises from about 5 wt. % to about 50 wt. % of the mLLDPE based on the total weight of the composition, and when extruded as a molten resin displays a neck-in value that is about equal to or increased by less than 10% of the neck-in value observed when using the LDPE alone.

* * * * *